March 8, 1949.    A. R. WEINRICH    2,463,837
USE OF BORON OXIDE IN PRODUCING QUARTZ
COATINGS IN A VACUUM
Filed Nov. 15, 1946    2 Sheets-Sheet 1

*INVENTOR.*
ARTHUR R. WEINRICH
BY
ATTORNEYS

March 8, 1949.　　　　　A. R. WEINRICH　　　　　2,463,837
USE OF BORON OXIDE IN PRODUCING QUARTZ
COATINGS IN A VACUUM
Filed Nov. 15, 1946　　　　　　　　　　　　2 Sheets-Sheet 2

*INVENTOR.*
ARTHUR R. WEINRICH
BY
Whittemore, Hulbert
& Belknap  ATTORNEYS

Patented Mar. 8, 1949

2,463,837

UNITED STATES PATENT OFFICE 2,463,837

USE OF BORON OXIDE IN PRODUCING QUARTZ COATINGS IN A VACUUM

Arthur R. Weinrich, Brackenridge, Pa., assignor to Libbey-Owens-Ford Glass Company, Toledo, Ohio, a corporation of Ohio Application November 15, 1946, Serial No. 709,928

5 Claims. (Cl. 117—106)

The present invention relates to a method of coating with quartz by thermal evaporation to improve the evaporation of the quartz so as to secure a rapid and easy evaporation of the same, which may be controlled, and to provide for uniform thermal evaporation of the quartz and uniform and heavy coatings of the quartz upon articles of manufacture such, for example, as glass, plastic, reflectors, mirrors, articles coated for low reflection, or other articles of manufacture. The invention may be employed in the production of coatings in which the quartz layer functions in producing low reflection effects.

Quartz is highly transparent and because of this and its known characteristic of extreme hardness, it provides a particularly desirable and satisfactory permanent coating or covering for the face or surface of a mirror or reflector, especially a first surface mirror or an article of low reflection, and such a coating prevents any danger of scratching or otherwise marring such face or surface.

Attempts to thermally evaporate quartz directly by the method of thermal evaporation and to apply it by deposition to surfaces, such as reflective surfaces, have not been satisfactory for the reason that quartz is extremely difficult to heat and to evaporate. Quartz must be heated beyond 1500° C. to bring about vaporization and preferably quartz must be heated to a range of 1800° to 2000° C. or more. It is known that quartz does not absorb heat by radiation and does not melt during evaporation. As a solid it does not adhere to or wet a thermal heating element or filament or other heating surface and the thermal contact with such element, filament or surface is very poor. Thus, getting heat into quartz becomes a problem and as its temperature must be raised very greatly to secure evaporation it has been found that quartz does not lend itself to evaporation by normal thermal evaporation technique. Where attempts have been made to thermally evaporate ordinary quartz within a vacuum and to deposit this upon a surface as a coating, the operations have been found to be very uncertain and at best only small quantities of the quartz could be evaporated. Further the process of deposition was slow and unsatisfactory and uniform coatings were not obtained.

I have discovered that when the quartz to be evaporated is heated in a vacuum as a mixture with or in the intimate presence of boric oxide or one of the boric acids which form boron oxide under such conditions that the thermal evaporation of the quartz is materially enhanced in that it becomes more uniform and more rapid and, moreover, that the coating of a surface, such as glass, plastic, or a reflective surface, by deposition thereupon of evaporated quartz, could be satisfactorily controlled to produce a uniform protective coating or a desired low reflection coating.

It is therefore one of the objects of the invention to provide an improved method or process whereby the thermal evaporation of quartz and its application, by deposition, as a coating or covering for a surface can be achieved.

Another object of the invention is to provide an improved method or process whereby the evaporation of quartz can be controlled and speeded up to produce, by deposition, a uniform and relatively thick and extremely hard protective surface coating on the face or surface of an article, such for example as glass or plastic, or the reflective or mirrored surface of a piece of glass.

Another object of the invention is to provide improved means or method whereby the quartz may be preliminarily treated, or mixed with the desired oxide in a relatively simple and inexpensive manner to prepare the quartz for relatively rapid evaporation and dispersion when it is applied to a heat radiating support body within a vacuum such as an electrical thermal evaporation element and more particularly a tungsten or other filament or an electrically heated crucible.

In accordance with one method of carrying out the invention, the quartz to be evaporated and deposited upon a surface is first intimately mixed as pieces or powder with powdered boron trioxide or with boric acid, pyroboric acid, or tetraboric acid by subjecting the quartz and the powdered boron compound to a tumbling action. The boric acids are each decomposible by heat to form boron oxide and there may also be used fluoboric acid and borotungstic acid which likewise break up upon being heated to provide boron oxide. The dusty coating upon the quartz pieces or the mixture with the quartz of the boron oxide or boron compound decomposible by heat to provide boron oxide, is then fused with, or sintered to the quartz by a preliminary heat treatment which also serves to decompose the boron compounds to boron oxide. The intimately mixed materials thus prepared may then be applied to and supported by a heat radiating support body in a vacuum chamber or if desired the fusion of the materials in the presence of each other may be carried out in the vacuum chamber with the materials on the heat radiating support body just prior to the subsequent evaporation of the quartz from the intimate mixture thus produced. Other methods of mixing the boron compounds intimately with the quartz so as to provide boron oxide in contact with the quartz at the time of its evaporation have been found to give the rapid and controlled evaporation of the quartz described by the invention when the mixture is subsequently heated in a vacuum. As boron oxide is fairly volatile at temperatures lower than that required to evaporate the quartz it has been found desirable that it be intimately mixed with the quartz so that some boron oxide be present when the quartz begins to evaporate. Many borates carry an excess of boron oxide and these may be used as a source of boron oxide and there may thus be employed with the quartz sodium tetraborate or borax, or the mineral colemanite which is a calcium tetraborate.

The quartz treated or mixed with oxide in the manner above described is according to the method of this invention then placed in a suitable manner in a vacuum in a heat radiating support body such as an electrically heated coil or an electrically heated receptacle. In the present instance, the coil is a tungsten filament and the receptacle is a crucible. Such support body is then heated to heat the quartz. A superficial molten condition generally appears on the surface of the heated treated quartz which permits securing good heat contact by the quartz with the heat radiating support body such as the filament or crucible. The treated quartz due to the oxide mixed therewith in contrast to ordinary quartz alone readily absorbs radiant heat, and both this condition and the good thermal contact secured by the slight fusion, permit the rapid influx of heat into the quartz and the raising of its temperature to a point where evaporation can be secured. The temperature of the heat radiating support body is maintained at a high degree and the heat penetrates the entire body of the treated quartz so that its evaporation proceeds positively and regularly, thus permitting by reason of uniform thermal evaporation from all surfaces of the quartz, the securing of uniform and controlled surface coatings of quartz by the deposition of the evaporated quartz upon the surface of an article of manufacture, such for example as a mirror.

In general then, the process or method comprises positioning quartz mixed intimately with or prefused with boric oxide or a boron compound which supplies boric oxide on heating adjacent to and preferably on and supported by a heat radiating support body such as an electrically heated filament, receptacle or crucible within a high vacuum and heating the quartz and oxide to a high temperature by conduction and/or heat radiation from such support body and continuing the heating to evaporate the quartz and deposit the quartz upon a surface of a support, mirror, or other article.

The foregoing and other objects and advantages of the invention will appear from the following description and appended claims when considered in connection with the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Figure 1:
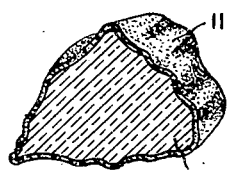
Figure 1 is a fragmentary perspective view, partly in section, showing a piece of boron oxide precoated or covered quartz of irregular contour, in accordance with the invention.

Referring now particularly to Figure 1 of the drawings, there is shown a lump or piece of quartz 10 of irregular contour or formation upon the surface of which there is provided a coating or covering 11 consisting of boron oxide fused thereto.

Figure 2:
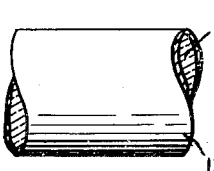
Figure 2 is a fragmentary elevational view, partly in section, showing a precoated round bar, rod, or stick of quartz, in accordance with the invention.

In Figure 2 there is shown a similarly coated round bar, rod or stick 12 of quartz in which the surface coating or covering, is shown at 13. It is to be understood that the coating or covering 11 or 13 may be applied to the surface of the quartz in any suitable manner.

Figure 3:
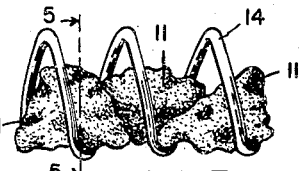
Figure 3 is an elevational view of a portion of an electric coil or filament shown supporting several irregular pieces of oxide precoated or covered quartz, to which, when the filament is heated, it may radiate and supply heat, in accordance with the invention.
Figure 4:
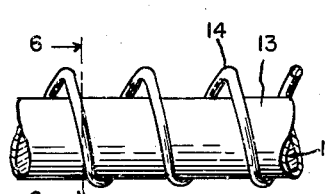
Figure 4 is a view similar to Figure 3 showing a round bar or rod of oxide precoated quartz similarly supported by an electric coil or filament.

It is not necessary that the entire surface area of the quartz be covered by boron oxide as seen in Figures 2 and 4. If desired, the particles of the coating or covering of oxide may be slightly spaced apart on the surfaces of the quartz, as shown at 11 in Figures 1 and 3. Coatings or coverings of this type result from the action of tumbling the oxide powder with the quartz pieces.

Figure 5:
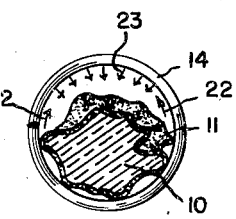
Figure 5 is a vertical sectional view taken substantially along the line 5—5 of Figure 3, looking in the direction of the arrows.
Figure 6:
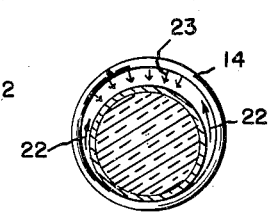
Figure 6 is a vertical sectional view taken substantially along the line 6—6 of Figure 4, looking in the direction of the arrows.
Figure 7:
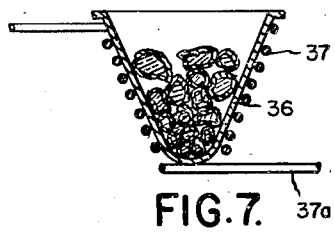
Figure 7 is a sectional view of an electric heating coil and crucible in accordance with the present invention, the crucible, as shown, containing pieces of an intimate mixture of quartz and the oxide.
Figure 10:
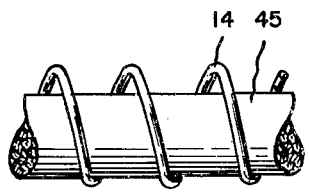
Figure 10 is a view similar to Figure 4 showing a round bar or rod of commingled or intimately mixed quartz and boron oxide.

After having been coated or covered with the oxide the quartz pieces of irregular shape 10, or of round bar or rod shape 12 are, as illustrated in Figures 3 to 6, inclusive, placed within the coil of an electric filament, such as the filament 14, or within a refractory thoria or other crucible 36, such as shown in Figure 7, the latter being shown as supported and heated by a substantially cone-shaped filament 37. In similar manner intimately formed mixtures 45 such as already described of the quartz and the oxide may be applied to a filament 14 as shown in Figure 10 or within a refractory thoria or other crucible, such as shown in Figure 7. The cone-shaped coils 37 and crucible 36 supply supporting means for the quartz during the evaporation of the latter and at the same time serve as a source of heat by radiation and conduction when an electric current is passed through the tungsten or other metal comprising the coils 37. It will be understood that the filament ends or extensions 37a provide means for connection to a suitable source of electrical energy.

Figure 8:
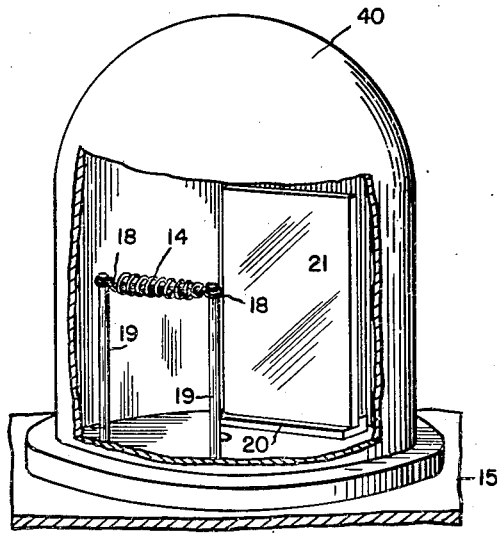
Figure 8 is a perspective view, partly broken away, of a suitable apparatus for performing the technique of evaporation of the oxide precoated or covered quartz, or of the quartz in the presence of the oxide in accordance with the invention, and for effecting the quartz deposition upon the surface of an article.

Referring now particularly to Figure 8 of the drawings, there is shown suitable apparatus for effecting the thermal evaporation of the oxide coated quartz or of the quartz intimately mixed with the oxide. The apparatus, as shown, comprises a bell jar 40 attached to vacuum pumps (not shown), and containing a tungsten electric coil 14 supported by upright supports 19 carried by the base 15, and brackets 18 adjusted on the upright supports and adapted to receive the ends of coil 14 to support it. It is apparent that the thoria or other crucible 36 and the supporting conical filament 37 as shown in the other figures could be substituted in such apparatus for the electric coil or filament 14 to which it is equivalent in function. As shown in the figure, the base 15 is provided with a supporting member 20 for supporting an article to be coated with quartz such as a mirror, reflector, piece of glass, or other suitable member in upright position within the chamber, the article 21 being located opposite the coil or filament 14. Where a thoria crucible assembly such as is shown is to be employed, the evaporation is upwards and the article to be coated would, therefore, be located above the crucible assembly in any suitable manner.

In order to coat the article with quartz and to evaporate the same, the chamber of the apparatus of Figure 8 is evacuated to a high degree, such as to about 10 to the minus 5 millimeters, by means of suitable pumping apparatus or equipment (not shown) for this purpose. The electric coil or filament 14 is now energized and thus heated, whereupon the oxide coated quartz or intimate mix of oxide and quartz will tend to adhere to the filament as the oxide melts and, in effect, wet or coat the filament 14 due to the formation thereby of a superficial molten condition on the surface of the quartz. The heat from the filament 14, with which the pieces or sticks, as the case may be, of oxide treated quartz are in actual physical contact throughout a portion of their surface area through the medium of the molten coating 11 or 13, is directly communicated to the quartz. Quartz alone is a poor heat conductor.

As seen in Figures 5 and 6, the heat waves travel upwardly in molten coatings such as 11 and 13 generally in the direction of the arrows 22 to completely encircle the surface of the quartz and oxide mixture in intimate contact with each other, such as the coated quartz or quartz and oxide mixture. Radiant heat from those portions of the filament 14 with which the treated quartz is not actually in physical contact, travels from the filament generally in the direction of the arrows 23 to the heat radiation absorbing oxide treated quartz or molten coatings 11 or 13 thereon and thence, by surface contact, directly to the quartz 10 or 12. Quartz alone does not absorb radiant heat to any large degree and is hence difficult to heat. With the oxide treated or mixed quartz, however, all portions or surfaces of the coated quartz or quartz mixture with oxide are subjected to the heat, the quartz becoming heated throughout by such radiation absorption and by virtue of this, evaporation can be secured from all quartz surfaces and uniformly in all directions so that both the heating and the evaporation of the quartz are controlled and effectually accomplished.

The maintenance of a high degree of heat on the heat radiating quartz supporting coil or filament 14, or the similar heat radiating and supporting thoria crucible 36, will now cause the thermal evaporation of the quartz. The molecules or particles thereof will be dispersed and deposited upon the article 21, such as the reflective face of a mirror or reflector located within the apparatus, to produce on said article or reflective surface, a protective hard coating or layer of quartz which is uniform and relatively thick.

Figure 9:
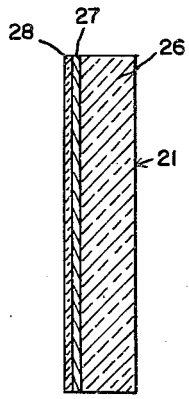
Figure 9 is a sectional view of a mirror or reflector having a surface protective coating or layer of quartz produced in accordance with the present method or process.

In Figure 9 there is shown a finished product or article produced in accordance with the invention. In this figure, the article, for example a mirror or reflector 21, has a backing or base 26, preferably formed from glass, a reflective or mirror surface or face 27, and a relatively thick and uniform protective surface coating or layer 28 of quartz. It is to be noted particularly that the quartz protective coating or layer 28 is relatively thick and uniform so as to provide a permanent protective coating or surface for the mirror or reflector to prevent any danger of damaging or marring the mirror or reflective surface by scratching, or otherwise.

Quartz must be heated to temperatures beyond 1500° C. to obtain evaporation thereof in a high vacuum. It is believed that the mere heating of quartz in a tungsten electric resistance coil, as in most previous attempts to evaporate this material, failed despite high heater wire temperatures, because of the fact that a large or major portion or area of the quartz was not heated to these high temperatures. This would appear to be due to both the poor heat conductivity and the poor radiant heat absorption of the quartz. Heating by convection currents is, of course, absent in a vacuum and the quartz which does not melt, becomes heated only at the immediate point at which it contacts the tungsten wire. This wire may easily be at a temperature above 3300° C. without the main body of the quartz being heated to a sufficiently high temperature, such as 1800° to 2000° C. or more, to evaporate in the vacuum. The localization of the heating with ordinary quartz is shown by a peculiar phenomena in that on close observation the quartz pieces are found not to remain at rest and in contact with the heater wires, but to actually "dance" on the same. Thus, the localized areas in contact with the heater wire are raised sufficiently in temperature to vaporize some quartz and the pressure of such vapor at this spot, which exists only on the heater contacting side of the piece, is sufficient to lift the piece away from the wire. This breaks the thermal contact and the quartz piece immediately cools and stops evaporating and as the vapor pressure disappears, the piece again falls onto the wire. Thus, the only means of getting heat into the clear non-radiant heat absorbing quartz is by the application of a localized thermal contact which is constantly broken. In the case of heating a rod of uncoated quartz, the quartz continuously bounds around inside the coil as it is blown away from contact and on hitting on the other side and making thermal contact, it again bounces back off. It will be understood, therefore, that as thermal conduction is poor in the untreated quartz most of the surface of the quartz (and the inside of the particles) do not get sufficiently hot to become evaporating surfaces and hence there is no uniformity of evaporation in all directions into the apparatus. The evaporation secured is sporadic and undependable, and relatively small in quantity.

In accordance with the method here set out these difficulties have been overcome by getting the quartz uniformly and highly heated throughout so that all surfaces of the quartz become evaporation surfaces, by applying to or mixing with the quartz an oxide which absorbs radiant heat, which conducts heat around the particles or through the mixture, and which generally gives a superficial molten phase to the quartz which increases the heating also through better thermal contact, thus permitting the rapid evaporation of relatively large quantities of quartz in a short time and uniformly in all directions.

In Figure 10 the premolded or preferably prefused rod 45 of intimately mixed finely divided quartz and oxide offers advantages for thermal evaporation since such rods or similarly formed pellets may be readily placed upon the supporting and electrical heating coils 14.

Figure 11:
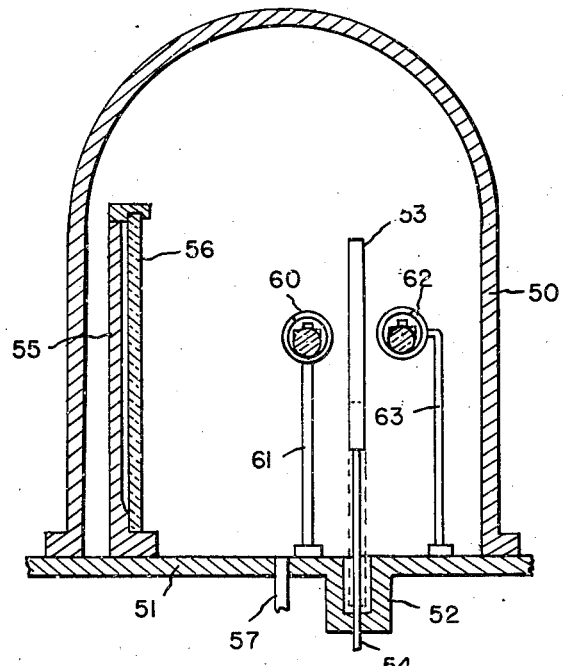
Figure 11 is a vertical section through apparatus for effecting first a deposition of a metal or other film, followed by deposition of quartz in accordance with the present invention.

The present method of depositing a quartz coating may advantageously be combined with the step of forming a first coating, and apparatus for carrying out this method is illustrated in Figure 11. In this figure there is shown a bell jar 50 carried by a base 51 which in turn is provided with a well 52 for partially receiving a shield 53. Means such as the rod 54 are provided for raising and lowering the shield between the full line and dotted line positions shown.

Inside the bell jar or vessel 50 is a support 55 for an article 56, a surface of which is to be coated. A connection to suitable evacuating apparatus (not shown) is indicated at 57, and in use the interior of the vessel 50 is evacuated.

A first filament 60 is carried in the vessel by a support 61, and an additional filament 62 is provided, carried by filament support 63. Filaments 60 and 62 are spaced apart, and the shield 53 is movable into and out of position therebetween, as illustrated.

In use, filament 60 may contain a metal to be evaporated onto article 56, and filament 62 may contain quartz treated as disclosed herein. With shield 53 in position between filaments 60 and 62, filament 60 may first be energized to effect deposit of the metal film, after which shield 53 is dropped, filament 62 energized, and the quartz layer deposited on the metal film just laid down.

Figure 12:
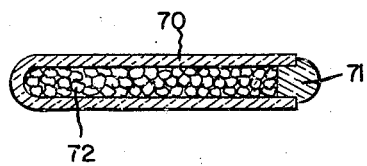
Figure 12 is a longitudinal section through a closed quartz tube containing a boron oxide material effective to absorb radiant heat, illustrating another embodiment of the present invention.

Another method of carrying out the invention is illustrated in Figure 12, in which there is illustrated at 70 a quartz tube closed at one end and having its opposite end closed by a plug 71 which if desired may also be of quartz. Inside the tube 70 is placed a boron oxide material 72.

The tube 70 is placed within an evacuated bell or vessel such as shown at 40 in proximity to a source of radiant heat. The quartz is substantially transparent to radiant heat, so that when the source is energized, radiant heat passes through the walls of tube 70, and is absorbed by material 72. This results in raising the temperature of the material, and the transfer of heat therefrom to the tube 70 by conduction. By this means, the temperature of the quartz tube 70 may be raised to a point where thermal evaporation takes place from the outer surface of the tube, which is exposed to the vacuum prevailing within the bell 40.

*Example 1*

By way of a further example illustrating the application of the invention in the forming of a mirror protected by a quartz surface layer two filaments in an apparatus generally similar to Figure 8 were loaded as follows: In the first filament there was placed 0.75 gram of silver and in the other filament there was placed a prefused rod of an intimate mixture of quartz with 4% of boric oxide, the rod weighing a total of 0.33 gram. A cleaned piece of glass was placed to the side of these filaments at a distance of twelve inches. The chamber was then closed and evacuated to produce the required high vacuum. A shield was positioned between the two filaments and the silver carrying filament which was closest to the glass was energized and the silver evaporated and deposited upon the glass support to form a mirror deposit thereon. Next the shield, which had protected the quartz rod from the silver was removed and the filament carrying the mixture of quartz and boric oxide was then heated in the vacuum. The quartz then readily evaporated upon the continued application of the heat and deposited upon the silver-coated glass. This gave a silver first surface mirror in which the silver coating and protective quartz coating thereon were of about equal thicknesses of the order of .0001 millimeters.

*Example 2*

Small quartz rods, ⅛ inch in diameter were rolled each separately in powdered boron trioxide, ordinary boric acid, and borax. The three respectively coated rods were then heated briefly in a blow torch to sinter and to fuse the dusty coatings to the surface of the quartz rods so that they might more readily be handled and to also decompose the boric acid to boron oxide. The weight increase of the rods was less than ½% in each case. Each rod was then mounted in a tungsten heating coil in the required high vacuum and when the quartz so treated was highly heated in each case it evaporated rapidly and uniformly while practically no evaporation was secured with similar untreated quartz rods even when the tungsten coils were heated up to practical melting of the coil which occurs at about 3370° C. With the treated rods is was only necessary to heat the coil filaments to temperatures in the range of 1800° to 2500° C. to secure easy evaporation of the quartz which was heated largely by radiation.

*Example 3*

A powdered mixture of calcium tetraborate and precipitated silica was made up in which the calcium tetraborate was 5% by weight. This mixture was made into pellets and on heating this intimate mixture in high vacuum in a heated refractory metal filament which radiated heat to the quartz containing pellets a slight fusion occurred and the quartz was found to readily evaporate as compared to pellets of the precipitated silica alone which would not evaporate under comparable heating and vacuum conditions. The calcium tetraborate provided a source of boron oxide in the mixture where it was used.

*Example 4*

Small quantities of boric oxide, the mineral colemanite, and of borotungstic acid in powdered form were loaded separately into the inside of three small ⅛ inch diameter quartz tubes of the type illustrated in Figure 12. The tubes were plugged with small quartz rods and heated in a blow torch to prefuse the boron compounds and in the case of the borotungstic acid and calcium tetraborate to decompose these and set free boron oxide. On placing these tubes separately in a refractory heating coil such as a tungsten coil in high vacuum and applying heat to the coil the latter quickly heated the treated quartz by heat radiation absorption and rapid uniform evaporation of the quartz was easily attained. Similar untreated quartz tubes would not evaporate under the same conditions of temperature of filaments and degree of high vacuum.

It is obvious that by the new methods of evaporating quartz thus above described there can readily be deposited quartz in any desired thickness upon a support surface of glass, plastic, or other material to produce a desired article of manufacture. For example, low reflection articles involving a quartz deposit may thus be produced as well as mirrors having a deposit of quartz forming a protective layer.

What I claim as my invention is:

1. The method of coating a surface of an article with quartz by evaporation technique within a vacuum, comprising heating quartz in intimate contact with boron oxide and supported by a heat radiating support body in a high vacuum to heat the quartz to a high temperature and to evaporate the quartz, and depositing the quartz on a surface of the article.

2. The method of coating a reflective mirror surface with quartz by evaporation technique within a vacuum, comprising heating quartz in intimate contact with boron oxide within a heat radiating support body in a high vacuum to heat the quartz to a high temperature and to evaporate the quartz, and depositing the quartz on a reflective mirror surface.

3. The method of coating a surface of an article with quartz by evaporation technique within a vacuum, comprising forming a fused mixture of boron oxide and quartz, positioning the fused mixture in a heat radiating support body in a high vacuum to heat the quartz to a high temperature and to evaporate the quartz, and depositing the quartz on a surface of the article.

4. The method of coating a surface of an article with quartz by evaporation technique within a vacuum, comprising enclosing boron oxide in a closed quartz receptacle and heating the quartz and boron oxide in a heat radiating support body in a high vacuum to heat the quartz to a high temperature and to evaporate the quartz, and depositing the quartz on a surface of the article.

5. The method of coating a surface of an article with quartz by evaporation technique within a vacuum, comprising heating quartz in intimate contact with boric acid within a heat radiating support body in a high vacuum to heat the quartz to a high temperature and to evaporate the quartz, and depositing the quartz on a surface of the article.

ARTHUR R. WEINRICH.

No references cited.